April 22, 1947.  J. OMEL  2,419,417
ATTACHMENT FOR PHOTOGRAPHIC APPARATUS
Filed March 5, 1943
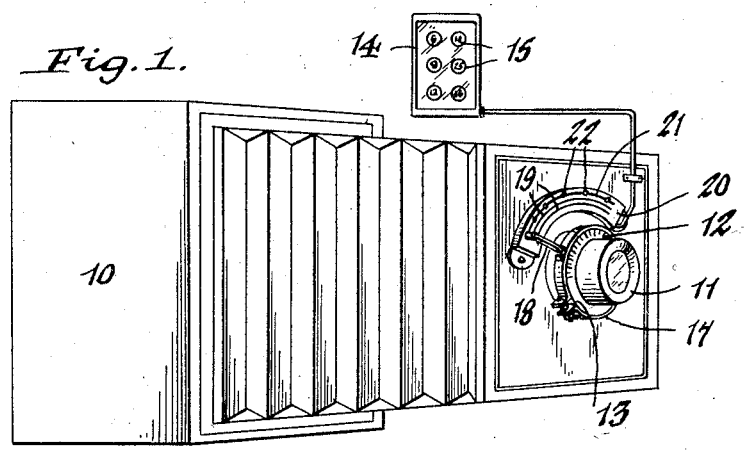
Fig. 1.
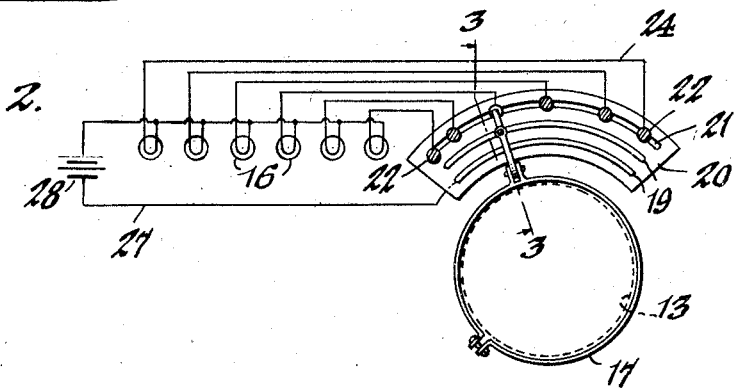
Fig. 2.
Fig. 3.
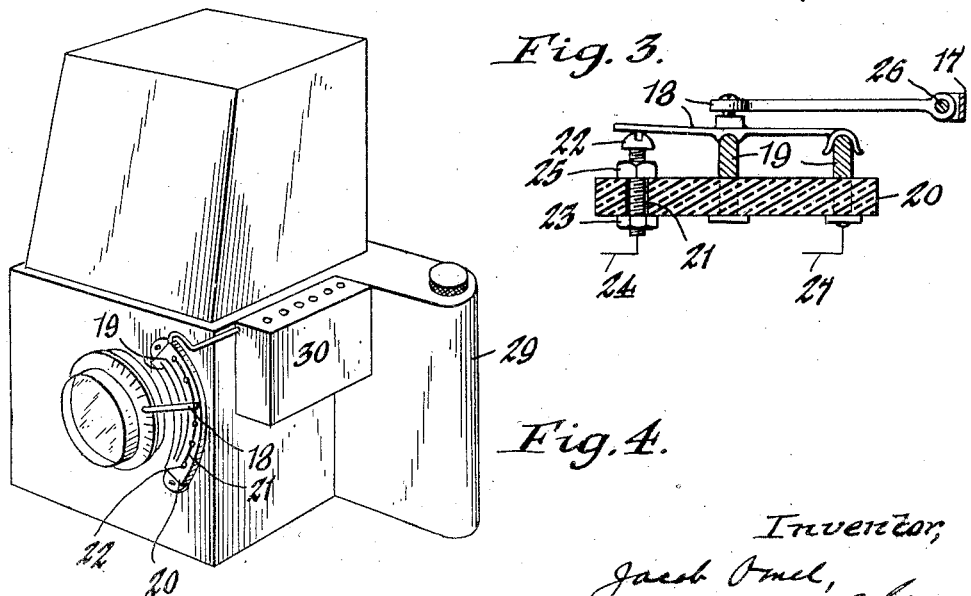
Fig. 4.
Inventor,
Jacob Omel,
by Walter P. Guyer
Attorney.

Patented Apr. 22, 1947

2,419,417

UNITED STATES PATENT OFFICE 2,419,417

ATTACHMENT FOR PHOTOGRAPHIC APPARATUS

Jacob Omel, Kenmore, N. Y.

Application March 5, 1943, Serial No. 478,107

2 Claims. (Cl. 177—311)

This invention relates generally to certain new and useful improvements in the art of photography, but more particularly to a visual indicating device for facilitating the reading of photographic adjustments, such, for example, as the diaphragm stop numbers on the lens barrel of an enlarger.

It has for one of its objects to provide an illuminable indicating device of this character which is so designed as to be operatively connected to the existing adjustable element to be controlled to register its corresponding positions of adjustment visually on the device and so positioned on the photographic apparatus as to be readily and conveniently visible to the operator and at all times and under varying conditions, as when working in the dark room.

Another object of the invention is to provide a visual indicator for use in registering the control settings of photographic apparatus which is simple, compact and inexpensive in construction, which is reliable, accurate and positive in operation, and which is so designed as to be embodied in new equipment or to be made as an attachment for present photographic apparatus.

Other features of the invention reside in the construction and arrangement of parts hereinafter described and particularly pointed out in the appended claims.

In the accompanying drawings:

Figure 1 is a perspective view of my visual indicator as applied to a photographic enlarging apparatus. Figure 2 is an enlarged plan view of the contact plate and contact arm in its relation to the lens barrel of the enlarger, together with the electric diagram of the circuit including the indicator lamps. Figure 3 is a cross section taken on line 3—3, Figure 2. Figure 4 is a perspective view showing the invention as applied to a reflex camera.

Similar characters of reference indicate corresponding parts throughout the several views.

While my invention is applicable to various types of photographic apparatus wherein it is desirable to facilitate the ready and convenient reading of the adjustments of any manually-controlled elements constituting a part thereof, I have shown it in connection with an enlarging apparatus wherein the numeral 10 indicates the body thereof, 11 the lens barrel, and 12 the diaphragm stop numbers or indications arranged in a circumferential row on the flange or collar 13 of the lens barrel. Because of the difficulty encountered by operators in reading these diaphragm stop numbers in the feeble light of a darkroom lamp, I provide a visual or illuminated indicator mechanism operative in response to the adjustments of the lens barrel to effectually and clearly show to the operator the readings of the diaphragm stop numbers as the lens barrel is adjusted and in such a manner that no light will be emitted which would be harmful to the enlarging operation.

This indicating mechanism may be built into a photographic apparatus or be made as an attachment for existing apparatus, and, as shown in the drawings preferably consists of an indicating panel or box-like frame 14 adapted to be placed and suitably supported where desired for convenience of ready observation and including a plurality of indicators 15 companion to and bearing diaphragm stop numbers corresponding to those arranged on the lens barrel. In illuminating relation to these indicators are companion electric lamps 16 included in an electric circuit and adapted to be selectively lighted in response to the movement of the lens barrel 11 to its various positions of adjustment, there being an electric lamp for each stop number on such barrel. In order to prevent the light from these lamps endangering the enlarging paper or the operations incidental to the enlarging process, the indicators 15 may be made of a light-deadening material, such as ruby-colored glass or the like, which will prevent reflection of the light rays but will still enable the operator to distinctly see the stop-adjustment indicators.

Mounted on the collar 13 of the lens barrel is an adapter band or ring 17, which may be in the form of a split ring for detachably connecting it to the barrel-collar to turn therewith. A contact arm 18 projects radially from this ring in guiding engagement with curved tracks or guide rails 19 applied to an arcuate supporting plate 20 mounted in any suitable manner on the enlarger body in concentric relation to the lens barrel. Outwardly of these guide rails this supporting plate has a similarly curved slot 21 in which are adjustably mounted a plurality of contact posts 22, one for each indicator-lamp 16. These contact posts may be in the form of bolts each having a contact bar 23 at its inner end connected by a wire 24 with one terminal of its companion lamp 16, while a lock nut 25 serves to hold the post in a set position of adjustment corresponding to that of a given diaphragm stop member on the barrel. The contact arm 18, as the lens-barrel is adjusted, is adapted to make contact with one or another of these contact posts and accordingly light the lamps in circuit therewith. By preference, this contact arm is mounted on a frictional pivot 26 applied to the adapter ring 17 to enable such arm to be adjusted laterally with respect to the contact-supporting plate 20 to readily adapt it to any varying dimensions between the collar 13 on the lens barrel and the opposing attaching wall of the enlarger on which such plate is mounted. One of the guide rails 19 with which the contact arm 18 engages, is connected by a wire 27 with the battery 28 or other source of electric power to complete the circuit through the lamps 16.

In Figure 4 I have shown my invention applied to a miniature reflex camera 29, the numeral 30 indicating the indicator frame which houses the electric lamps which are connected electrically to the diaphragm stop members on the lens barrel, as in the previously described construction, and which indicator frame is applied to a portion of the camera which is conveniently visible to the user when focusing or taking a picture. The indicating mechanism is identical with that previously described and it bears similar reference numerals.

I claim as my invention:

1. A camera attachment, comprising a plate adapted for attachment to the camera about the lens barrel thereof and having contact posts mounted thereon for adjustment relative thereto to accord with the diaphragm stop numbers on the dial, and a collar adapted for attachment to the lens barrel for movement therewith and having a contact arm mounted thereon for traversing engagement with said contact posts.

2. An indicator attachment of the character described for use with a lens barrel or the like, comprising a supporting plate adapted to be disposed in adjoining concentric relation to the lens barrel and having switch contact posts mounted thereon in registering relation with the diaphragm stop numbers on said barrel, an electric circuit including said contact posts and indicator lamps companion to those of such diaphragm stop members, a supporting panel for housing said lamps at a point remote from the lens barrel, a collar adapted to be detachably applied to the lens barrel and housing a contact arm fulcrumed thereon for transverse adjustment to bring such arm into and out of operative relation to said contact posts to close the circuit in response to the adjustments of said lens barrel and light the indicator lamp companion to a given adjustment.

JACOB OMEL.

REFERENCES CITED

The following references are of record in the file of this patent:

UNITED STATES PATENTS

| Number | Name | Date |
|---|---|---|
| 914,626 | Wood | Mar. 9, 1909 |
| 690,800 | Walther | Jan. 7, 1902 |
| 1,467,982 | Johnson | Sept. 11, 1923 |
| 1,912,263 | Del Sonno | May 30, 1933 |

FOREIGN PATENTS

| Number | Country | Date |
|---|---|---|
| 339,102 | British | Dec. 4, 1930 |